3,212,954
NUCLEOSIDE-5'-SULFOXIDES
Richard Kuhn, Heidelberg, Werner Jahn, Peterstal, near Heidelberg, Friedrich Bickelhaupt, Neckarhausen, near Mannheim, and Wolfgang Schaumann, Mannheim-Waldhof, Germany, assignors to C. F. Boehringer & Soehne, G.m.b.H. Mannheim-Waldhof, Germany, a German corporation
No Drawing. Filed Dec. 17, 1963, Ser. No. 331,091
Claims priority, application Germany, Dec. 22, 1962, B 70,122
8 Claims. (Cl. 167—65)

This invention relates to new sulfoxides having blood pressure reducing action. More particularly, the invention relates to certain 5'-sulfoxides of nucleosides having blood pressure reducing action and formulation thereof as therapeutically useful compositons.

The active blood pressure reducing agents in accordance with the present invention can be identified as 5'-sulfoxides of nucleosides of the formula

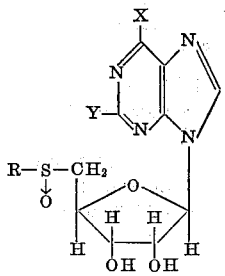

wherein X and Y are hydrogen, amino or hydroxyl groups and R is an alkyl or alkenyl radical containing up to 5 carbon atoms or similar radical in which one or more hydrogen atoms have been replaced by halogen, or an aralkyl or cycloalkyl radical. More specifically, the present invention and the foregoing formula embrace the active compounds:

Methyl-[adenosyl-(5')]-sulfoxide
Ethyl-[adenosyl-(5')-]sulfoxide
Allyl-(adenosyl-5')-sulfoxide
n-Propyl-(adenosyl-5')-sulfoxide
Iisopropyl-(adenosyl-5')-sulfoxide
Methyl-[guanosyl-(5')]-sulfoxide These compounds possess blood pressure reducing properties and are useful in the management of hypertensive states with substantially no incidence of undesirable side effects. These properties appear to be unique with the foregoing compounds and are not found even in quite closely related purine compounds.

The active compounds can be prepared in various ways. One presently preferred procedure involves treating a 5'-desoxy-5'-R-thioether of a nucleoside or its 2',3'-acetals (followed by leavage of the same) with an oxidizing agent which has heretofore been used conventionally in the production of sulfoxides from thioethers. In the formula 5'-desoxy-5'-R-thioether of a nucleoside, R is alkyl or alkenyl in which one or more of the carbon atoms can be replaced by halogen, or R is an unsubstituted or substituted aralkyl or cycloalkyl radical. Hydrogen peroxide has proven particularly advantageous as oxidizing agent for use in the preparation of the compounds of the invention, however, peracids and halogens are also suitable and particularly bromine. The reaction can be conducted either in water or in a suitable organic solvent such as, for instance, acetone or chloroform.

Another procedure which can be employed for preparing the active compounds is to convert the sulfidic group of a 5'-desoxy-5'-R-thioether of D-ribose or desoxy-ribose to tetravalent sulfur using therefor substantially the same oxidizing agents and conditions of reaction as set out above in connection with the first mentioned process and thereafter treating the oxidized compound to effect the linkage with the purine. This process is conducted under conditions suitable for achieving the linkage of the two components while maintaining intact the non-participating groups present in the reactants. In this connection attention is called to the processes for preparing the 5'-thioether of nucleosides described in Bull. Chem. Soc. Japan, 35, 731/1963 ("The Syntheses of 5'-Desoxy-5'-Methylthio-Adenine and Its Analogues").

The products of the process are obtained in each case in 2 diasteriomeric forms (Karrer, "Lehrbuch der Organischen Chemie," 13th ed., 1959, pp. 139 seq.) and can be separated by conventional methods, as for example on the basis of their different solubility properties.

Where the starting materials to be used for the preparation of the novel compounds are themselves novel, a method of production is included. In certain instances and particularly where the starting materials themselves are novel, the intermediates produced during the reaction are novel and have not as yet been described in the art and literature.

The following examples will show how the active compounds of the present invention can be prepared but it is to be understood that these examples are given by way of illustration and not of limitation.

EXAMPLE 1

Methyl-[adenosyl-(5')]-sulfoxide 2.5 g. 5' - desoxy - 5' - methylthio-adenosine - (9) ("Berichte," 84, p. 633/1951) were dissolved in 50 ml. of 50% acetic acid containing 0.6 g. $H_2O_2$ (approximately twice the calculated amount). The resulting solution was allowed to remain for about 5 hours at room temperature, and thereafter the solvent was evaporated off by distillation. The residue thereby obtained was dissolved in 15 ml. methanol and the solution evaporated slowly over a period of about 20 hours at room temperature whereby the sulfoxide separated out in small needles. From a single run of this procedure, there were obtained approximately 1.5 g. of a mixture of two diastereomeric methyl-[adenosyl-(5')]-sulfoxides, which differ greatly from one another in respect to their optical rotatory power.

$C_{11}H_{15}N_5O_4S$ (313.3) calc.: C, 42.17; H, 4.83; N, 22.36; S, 10.23. Found: C, 41.93; H, 4.35; N, 22.69; S, 10.49.

EXAMPLE 2

Ethyl-[adenosyl-(5')]-sulfoxide 0.24 g. $H_2O_2$ (1.1 mols) in a few milliliters of glacial acetic acid were added to a solution of 2 g. ethyl-adenosyl sulfide in 60 ml. 50% acetic acid and the mixture permitted to stand for 6 hours at room temperature. Following removal of the solvent by vacuum, the reaction product could be recrystallized out of a small quantity of methanol. The yield of ethyl-[adenosyl-(5')]-sulfoxide amounted to approximately 1.7 g.

$C_{12}H_{17}N_5O_4S$ (327.4) calc.: N, 21.40; S, 9.77. Found: N, 21.23; S, 9.36.

EXAMPLE 3

Methyl-[guanosyl-(5')]-sulfoxide 60 mg. crystallized methyl-guanosyl sulfide were dissolved with heat in 5 ml. 60% acetic acid, and thereafter the solution was cooled down to −15° C. A solution of 10 mg. $H_2O_2$ (approximately 1.5 mols) in a little acetic acid was then added to the cooled solution. After 3–4 days, freeze-drying produced a crude product that could be dissolved and reprecipitated out of water with acetone.

By repeating this operation once, 45 mg. of methyl-[guanosyl-(5′)]-sulfoxide were obtained. The compound was demonstrated by paper chromatography to be a single substance.

$C_{11}H_{15}N_5O_5S$ (329.3) calc.: C, 40.12; H, 4.56. Found: C, 39.87; H, 4.86.

EXAMPLE 4

Allyl-(adenosyl-5′)-sulfoxide 28 g. (0.0865 mol) allyl-(adenosyl-5′)-sulfide were dissolved in 515 ml. 50% acetic acid and 20.7 ml. (0.203 mol) perhydrol and the solution permitted to stand for 5 hours at room temperature. The solution was then evaporated to dryness using vacuum and a temperature of 40% C. and the residue recrystallized repeatedly out of isopropanol. 10.7 g. (36% yield) of allyl-(adenosyl-5′)-sulfoxide having a melting point of 130–133° C. were obtained.

The allyl-(adenosyl-5′)-sulfoxide which was used as starting material was obtained in the following manner:

39.8 g. (0.416 mol) of allylmercaptan sodium salt were introduced into 400 ml. liquid ammonia with stirring and 96 g. (0.208 mol) of 5′-desoxy-5′-tosyl-2′,3′-isopropylidene-adenosine were then added. After 20 hours the ammonia was evaporated off, the residue dissolved in ammonium chloride solution and chloroform, and the chloroform solution dried with sodium sulfate and concentrated by evaporation. The resulting concentrate was recrystallized out of a small amount of methanol. 59 g. (78% yield) of 5′-desoxy-5′-allylthio-2′,3′-isopropylidene-adenosine having a melting point of 114° C. were thereby obtained.

77.6 g. (0.216 mol) of this product were added to a mixture of 610 ml. of normal sulfuric acid and 77.6 ml. glacial acetic acid and the resulting mixture allowed to stand for 4–5 days with occasional shaking until all of the 5′-desoxy-5′-allylthio-2′,3′-isopropylidene-adenosine were dissolved. The solution was neutralized with 4 N caustic soda solution and the precipitate which separated recovered by suction filtering, vacuum dried and recrystallized out of isopropanol. 38.2 g. of allyl-(adenosyl-5′)-sulfide (55% yield referred to the isopropylidene derivative) were obtained. The product melted on the Kofler hot stage at 161–162° C., thereafter liquefied at 80–90° C. and resolidified.

EXAMPLE 5 n-Propyl-(adenosyl-5′)-sulfoxide 50 g. (0.154 mol) of n-propyl-(adenosyl-5′)-sulfide were dissolved in 920 ml. 50% aqueous acetic acid and 37 ml. perhydrol and allowed to stand for 5 hours at room temperature. The solution was then vacuum concentrated at 40° C. to dryness and the concentrate recrystallized out of isopropanol. 30.1 g. (yield 57.5%) of n-propyl-(adenosyl-5′)-sulfoxide having a melting point of 110–120° C. were obtained.

The n-propyl-(adenosyl-5′)-sulfide (M.P. 177–182° C.) starting material was produced in a manner analogous to that of allyl-(adenosyl-5′)-sulfoxide described in Example 4); the intermediate product 5′-desoxy-5′-propylthio-2′,3′-isopropylidene-adenosine melted at 108–111° C.

EXAMPLE 6

Isopropyl-(adenosyl-5′)-sulfoxide 22.8 g. (0.07 mol) isopropyl-(adenosyl-5′)-sulfide were dissolved in 920 ml. 50% aqueous acetic acid and 17 ml. perhydrol, the solution being permitted to stand for 5 hours at room temperature. The solution was then vacuum concentrated to dryness at 40° C. and the concentrate twice recrystallized out of isopropanol. 16 g. (yield 67%) of isopropyl-(adenosyl-5′)-sulfoxide having a melting point of 147–149° C. were obtained.

The preparation of the isopropyl-(adenosyl-5′)-sulfide required as starting material was carried out using 5′-desoxy-5′-isopropylthio-2′,3′-isopropylidene-adenosine as intermediate in a procedure analogous to that described in Example 4. The isopropyl-(adenosyl-5′)-sulfide had a melting point of 101–103° C.

EXAMPLE 7

Benzyl-(adenosyl-5′)-sulfoxide 33.4 g. (0.0895 mol) of benzyl-(adenosyl-5′)-sulfide were dissolved in 615 ml. of 50% acetic acid and 25 ml. perhydrol and the solution allowed to stand for 5 hours at room temperature. The solution was thereafter concentrated using vacuum at 40° C. to dryness and the resulting concentrate twice recrystallized out of isopropanol. 15.1 g. (yield 43%) of benzyl-(adenosyl-5′)-sulfoxide having a melting point of 159–162° C. were recovered.

The preparation of the benzyl-(adenosyl-5′)-sulfide starting material was conducted using 5′-desoxy-5′-benzyl-thio-2′,3′-isopropylidene-adenosine as intermediate in a manner analogous to that described in Example 4. The benzyl-(adenosyl-5′)-sulfide had a melting point of 151–154° C.

In order to evaluate the action of the compounds of the invention on blood pressure, the following compounds were evaluated both as to blood pressue reduction and duration of effect using as test animals for the determinations the rat:

A. Methyl-[adenosyl-(5′)]-sulfoxide
B. Ethyl-[adenosyl-(5′)]-sulfoxide
C. Allyl-(adenosyl-5′)-sulfoxide
D. n-Propyl-(adenosyl-5′-)-sulfoxide
E. Isopropyl-(adenosyl-5′)-sulfoxide
F. Methyl-[guanosyl-(5′)]-sulfoxide
G. 5′-desoxyadenosine-5′-methyl sulfide The last mentioned compound, namely 5′-desoxyadenosine-5′-methyl sulfide, was used as the basis for comparison.

In the experimental work, rats were anaesthesized with urethane and their blood pressure in the carotid artery determined using a mercury manometer. The initial pressure was determined, and then, in each case equal volumes of different test solutions were administered by steady intravenous infusion within 2 minutes at the rates indicated in the table. Thus, for example, 5′-desoxyadenosine-5′-methyl sulfide was administered for a first period of 2 minutes at a rate of 0.25 mg. per kg. per minute and immediately thereafter for another 2 minutes at 0.5 mg. per kg. per minute resulting in a total dose of 1.5 mg. per kg. The results of the experimental work are shown in the following table:

BLOOD PRESSURE REDUCTION AND DURATION OF EFFECT IN THE RAT

| Test Substance | Infusion, mg./kg./min. | Total, mg./kg. | Blood Pressure Reduction | | $ED_{80}$, mg./kg. | Half-Value Time, min. |
|---|---|---|---|---|---|---|
| | | | From mm. Hg | To mm. Hg | | |
| 1 | 2 | 3 | 4 | 5 | 6 | 7 |
| A | 0.4/0.8 | 2.4 | 105 | 54 | 1.5 | ≥19 |
| B | 0.15/0.3 | 0.9 | 93 | 66 | 0.5 | ≥16 |
| C | 0.5/1.0 | 3.0 | 101 | 61 | 3.0 | ≥15 |
| D | 0.5/1.0 | 3.0 | 92 | 68 | 3.0 | ≥20 |
| E | 1.25/2.5 | 7.5 | 116 | 60 | 5.3 | ≥20 |
| F | 0.5/1.0 | 3.0 | 104 | 75 | 3.0 | ≥20 |
| G | 0.25/0.5 | 1.5 | 104 | 59 | 0.125 | 9 |
|   | 0.1/0.2/0.4* | 2.1 | 100 | 76 | 1.2 | |

*For 3 minutes each.

In the table, the figures given in columns 4–7 are averages of at least four tests. Column 4 shows the average initial arterial blood pressure prior to the start of the infusion and in column 5, the blood pressure at the time of maximum effect is shown.

As a rule, the blood pressure at first drops rapidly, and then more and more slowly. Therefore, the moment of maximum effect often cannot be precisely determined. With this in mind, in the individual experiments, the much more precisely measurable level was determined, i.e., that at which 80% of the maximum drop had occurred.

The half-value times stated in column 7 do not have the conventional meaning. As used here, they designate that interval of time elapsed before the maximum blood pressure drop has risen back to one half the total drop. For example, if the blood pressure, as a result of the infusion, fell from 100 to 60 mm. Hg, column 7 shows how long a period was required for the blood pressure to rise to 80 mm. Hg. After the infusion was terminated, the blood pressure was recorded for an additional 20 minutes. Consequently, "half-value times" greater than 20 minutes are not covered. The figure >20 means that the blood pressure at that time had not as yet risen to half of the drop. The figure ≧15 minutes shows an increase in the blood pressure in a portion of the experiments.

The manner of action of the standard substance 5'-desoxyadenosine-5'-methyl sulfide was different qualitatively from that of the sulfoxides although this is not reflected in the table. After just a few seconds had elapsed from the start of the infusion, the blood pressure dropped abruptly to the minimum values given in column 5. Thereafter, although the infusion was continued, the blood pressure remained constant or even increased slightly. This, as well as the short time of the effect, as compared to the sulfoxides, is to be attributed to a strong inclination to tachyphylaxis, which was proven by the following observations:

(1) If 5'-desoxyadenosine-5'-methyl sulfide was infused at first at only 0.1 mg./kg./min., instead of 0.25, the blood pressure decreased only very slightly in spite of any increase in the dose. This could be interpreted as resulting from a rapid breakdown of the 5'-desoxyadenosine-5'-methyl sulfide as well as by tachyphylaxis, were it not for the observation that:

(2) After a one-time injection of 1.0 mg./kg., the blood pressure drops initially and then increases again, but a second injection is ineffective, even when the dose is increased. The abrupt onset of the effect and the strong tachyphylaxis exclude the use for therapeutic purposes of 5'-desoxyadenosine-5'-methyl sulfide.

On the other hand, the effect of the sulfoxides begins much more gradually. In the case of the test compounds, the $ED_{80}$ in column 6 is exactly the same as the total amount infused (column 3). This means that following completion of the infusion, the blood pressure dropped still further, in other words, a period of latency was involved. An increase in the dose of these compounds would be expected to result in an even greater blood pressure drop. In spite of the relatively low dosage, in the majority of the experiments, less than half of the blood pressure drop had been regained after 20 minutes.

The substance 5'-desoxyadenosine-5'-methyl sulfide used as standard had a marked blood pressure reducing effect but one which is produced only by rapid flooding and then it sets in very abruptly but shortly ceases. Because of the resulting poor controllability, its therapeutic use is out of the question. Where slow infusion of 5'-desoxyadenosine-5'-methyl sulfide is restored to, the compound is substantially ineffective. On the other hand, the sulfoxides are characterized by gradual onset and long duration of effect.

The new nucleoside 5'-sulfoxides can be used as medicaments, for example, in the form of pharmaceutical preparations which contain the active substance in admixture with an organic or inorganic, solid, or liquid carrier material suitable for enteral or parenteral administration. As carrier material, there come into consideration those substances which do not react with the new compounds, such as for example, water, gelatin, lactose, starches, colloidal silicic acid, magnesium stearate, talc, vegetable oils, benzoyl alcohols, gums, polyalkylene glycols, or other known carriers. The pharmaceutical preparations can be, for example, in the form of tablets, dragees, or in liquid form, as solutions, suspensions, or emulsions. They may also be sterilized and/or contain auxiliary substances, such as preserving agents, stabilizing agents, wetting agents, or emulsifying agents, or buffers. They may also contain other therapeutically valuable substances.

The preparations are made in the ordinary way.

What is claimed is:

1. A nucleoside 5'-sulfoxide compound of the formula

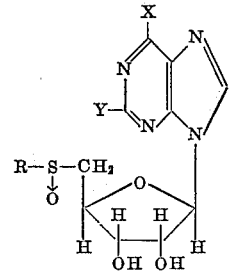

wherein X and Y independently represent a member selected from the group consisting of hydrogen, amino, and hydroxyl and R represents a member selected from the group consisting of alkyl of from 1 to 5 carbon atoms, alkenyl of from 1 to 5 carbon atoms, benzyl and cyclohexyl.

2. Methyl-[adenosyl-(5')]-sulfoxide.
3. Ethyl-[adenoxyl-(5')]-sulfoxide.
4. Allyl-(adenosyl-5')-sulfoxide.
5. n-Propyl-(adenosyl-5')-sulfoxide.
6. Isopropyl-(adenosyl-5')-sulfoxide.
7. Methyl-[guanosyl-(5')]-sulfoxide.
8. A pharmaceutical preparation comprising a nontoxic pharmaceutical carrier and nucleoside-5'-sulfoxide of the formula

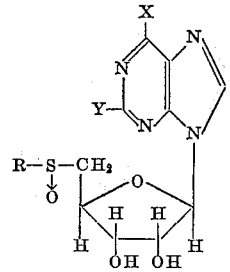

in which each of the radicals X and Y represents a member selected from the group consisting of hydrogen, amino, and hydroxyl, and R represents a member selected from the group consisting of alkyl of 1 to 5 carbon atoms, alkenyl of 1 to 5 carbon atoms, benzyl and cyclohexyl in dosage unit form as the active ingredient.

References Cited by the Examiner

UNITED STATES PATENTS 2,832,766  4/58  Wolfrom _____ 260—211.5
2,946,781  7/60  Shunk et al. _____ 260—211.5

OTHER REFERENCES

Bannister et al.: "J. Amer. Chem. Soc.," vol. 82, July 5, 1960, pp. 3363–3368.

LEWIS GOTTS, *Primary Examiner.*